United States Patent [19]

Becker

[11] Patent Number: 5,429,083
[45] Date of Patent: Jul. 4, 1995

[54] ROTARY INTERNAL COMBUSTION TWIN ENGINE

[76] Inventor: Robert W. Becker, 10 Tophill La., Springfield, Ill. 62704-4386

[21] Appl. No.: 301,877

[22] Filed: Sep. 7, 1994

[51] Int. Cl.⁶ ............................................. F02B 53/00
[52] U.S. Cl. .................................... 123/222; 123/239
[58] Field of Search ................... 123/204, 222, 239

[56] References Cited

U.S. PATENT DOCUMENTS

| | | | |
|---|---|---|---|
| 1,046,280 | 12/1912 | Diefenderfer | 123/239 |
| 1,856,011 | 4/1932 | Woodward | 123/204 |
| 4,825,827 | 5/1989 | Yang | 123/222 |
| 4,909,208 | 3/1990 | Krisztics | 123/222 |

FOREIGN PATENT DOCUMENTS 103086 5/1899 Germany ............................ 123/222

*Primary Examiner*—Michael Koczo

[57] ABSTRACT

A rotary internal combustion twin engine includes matching pairs of multilobed interengaging compression rotors compressing gas and air mixtures into compression chambers defined by concavities of transfer rotors. With a 180 degree rotation of transfer rotors, compression chambers become combustion chambers containing intermittent ignition devices. Ignited and expanded gasses impel lobes of matching pairs of multilobed interengaging expansion rotors providing rotational energy and exhausting burned gasses.

7 Claims, 1 Drawing Sheet

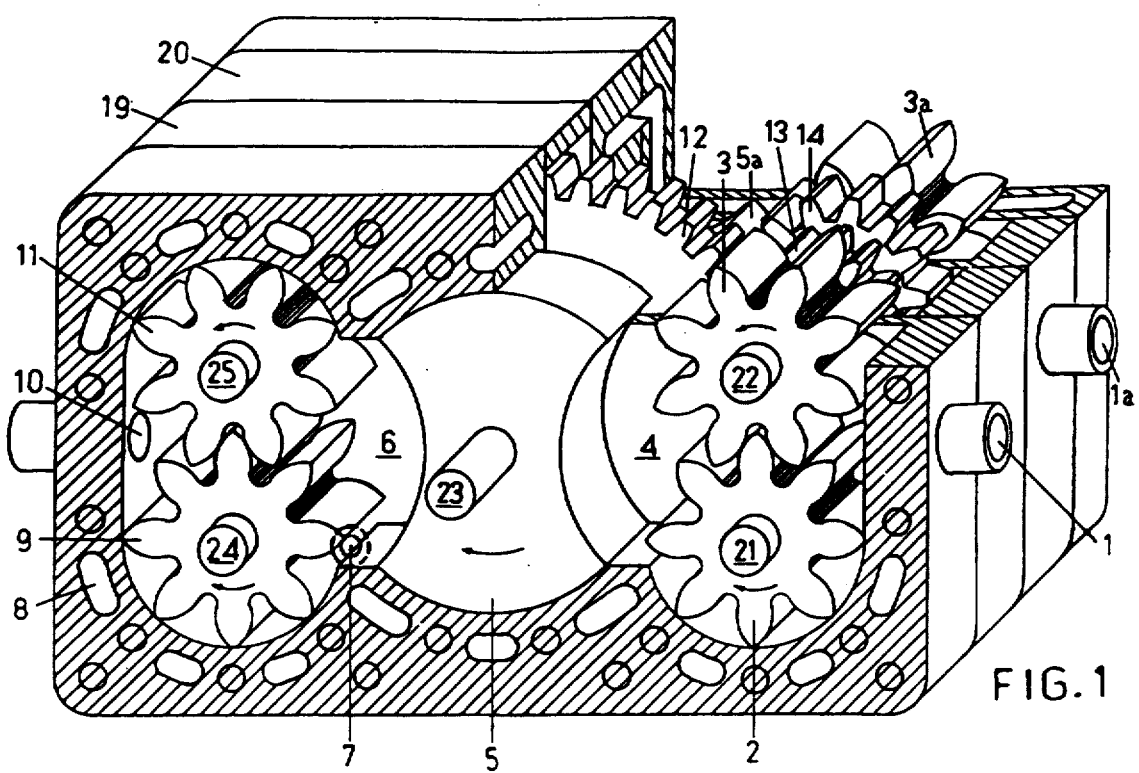
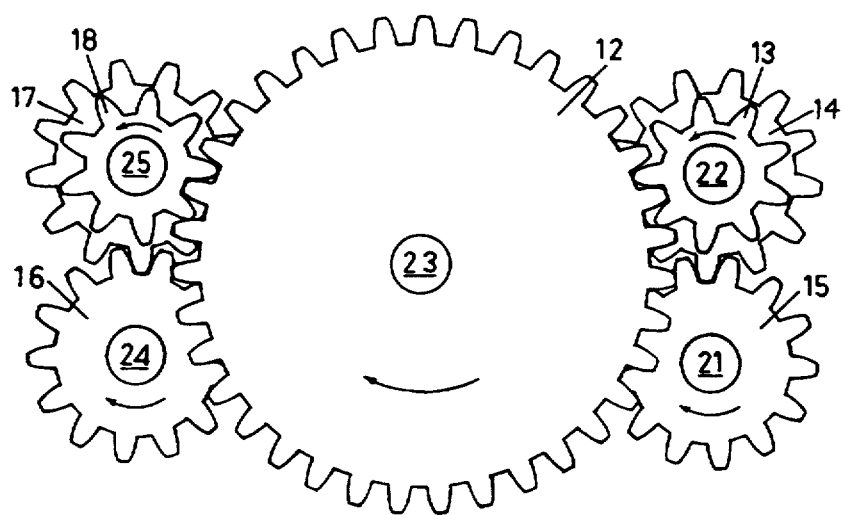

ROTARY INTERNAL COMBUSTION TWIN ENGINE

FIELD OF INVENTION

This invention relates in general to internal combustion engines and in particular to a rotary internal combustion twin engine comprising interengaging rotors.

DESCRIPTION OF PRIOR ART

Rotary internal combustion engines in the past have been devised to replace reciprocating engines which require forces to change directions of pistons and valves. Several rotary types have been devised. Included are designs which rely on eccentricity to achieve contraction and expansion chambers for compression and combustion, such as the Wankel engine. Such eccentricity also requires changes in direction. Other designs have oval shaped rotors sliding against chamber walls with only one dimension of contact points for sealing. Gear type designs with interengaging rotors and rolling contact between rotors reduce friction and provide two dimensional contact, or near contact, for sealing between rotors and chamber walls. One dimensional contact is confined between rotors. Known engines of interengaging rotors confine compression and combustion within the hollow spaces between rotor lobes resulting in low efficiency.

SUMMARY OF INVENTION

The object of this invention is to provide an improved rotary internal combustion engine of the gear type with rotors of circular and symmetrical shapes, constant circular motion and greater use of the hollow spaces between rotor gear lobes. Intermittent combustion is achieved by rotation of compressed gas and air mixtures within concavities of transfer rotors releasing the mixtures every 180 degrees of rotation for ignition by devices in combustion chamber walls. With each 180 degree rotation of transfer rotors, ignition devices in chamber walls ignite the mixtures. Expanding gasses provide rotational energy.

BRIEF DESCRIPTION OF THE DRAWINGS

FIG. 1 is a cut-away isometric drawing of the invention.

FIG. 2 is a two dimensional drawing of the gear train between the twin engines.

DETAILED DESCRIPTION OF THE INVENTION

A rotary internal combustion engine comprises matching pairs of multilobed interengaging rotors with gas and air transfer rotors in a housing of intersecting chambers. Compression rotors 2 and 3 draw gas and air mixtures in through intake port 1 into intersecting circular compression chamber 4. Compression chamber 4 is defined by concavities in gas and air transfer rotor 5. The gas and air mixtures are compressed in chamber 4 by further rotation of rotors 2 and 3. With a 180 degree rotation of transfer rotor 5, compression chamber 4 containing the compressed gas and air mixtures moves to become combustion chamber 6. The compressed gas and air mixture in chamber 6 is ignited by a recessed spark plug 7. Expanding gasses impel the lobes of expansion rotors 9 and 11 providing circular motion of rotors 9 and 11. Burned gasses are expelled through exhaust port 10.

Transmission spur gear 16 mounted on rotor shaft 24 and spur gears 17 and 18 mounted on rotor shaft 25 transfer rotational energy from expansion rotors 9 and 11 to transfer rotor spur gear 12 and to compression rotors spur gears 13, 14 and 15. Gear 12 mounted on drive shaft 22 provides rotation of the transfer rotor 5. Gears 13 and 14 mounted on shaft 22 and gear 15 mounted on shaft 21 provide rotation of compression rotors 2 and 3. Compression ratio can be modified by changing sizes of gears 12, 13 and 18 to provide desired compression ratio and sufficient exhaust of burned gasses.

An identical twin engine is enclosed in housing 20 comprising intake port 1a and identical concentric compression, transfer and expansion rotors. Twin upper concentric compression rotor 3a on shaft 22 is identical to rotor 3. Twin lower concentric compression rotor, not shown, on shaft 21 is identical to rotor 2. Twin concentric gas and air transfer rotor 5a on shaft 23 is identical to transfer rotor 5. Twin concentric expansion rotors, not shown, on shafts 24 and 25 are identical to rotors 9 and 11. Transfer rotor 5a is positioned on its axis 90 degrees from transfer rotor 5.

Transmission spur gears 12, 13, 14, 15, 16, 17 and 18 are enclosed in a central gear housing 19 containing lubricant for gears, shafts and rotors. Cooling is provided by a water jacket compartment 8.

I claim:

1. A rotary internal combustion engine comprising:
a housing of intersecting circular chambers,
matching pairs of multilobed interengaging compression rotors mounted on shafts supported in said housing,
a circular gas and air transfer rotor with concavities diametrically located on the periphery of said rotor defining alternating rotating compression and combustion chambers mounted on a drive shaft supported in said housing,
a recessed ignition device in said housing,
matching pairs of multilobed interengaging expansion rotors mounted on shafts supported in said housing,
and rotary transmission means mounted on said shafts to transfer rotational energy between said rotors and to provide desired compression, desired expansion and sufficient exhaust of burned gasses.

2. The rotary engine defined in claim 1, wherein said transfer rotor concavities extend along 90 degrees of said transfer rotor's periphery on opposite sides.

3. The rotary engine defined in claim 1, wherein compression chamber opening to said transfer rotor is equal in length and width with respect to opening of adjacent transfer rotor concavity when aligned horizontally.

4. The rotary engine defined in claim 1, wherein combustion chamber opening to said transfer rotor is equal in length and width with respect to opening of adjacent transfer rotor concavity when aligned horizontally.

5. The rotary engine defined in claim 1, wherein said transmission means comprise gears changeable in diametric sizes to provide desired compression ratio.

6. The rotary engine defined in claim 1, wherein said transmission means comprise gears changeable in diametric sizes to provide desired expansion rate.

7. The rotary engine defined in claim 1, further including an identical twin engine comprising an identical housing, chambers, ignition device and rotors mounted on said rotor shafts extended through said transmission means, with said identical transfer rotor positioned on its axis 90 degrees from the first said transfer rotor.

* * * * *